(12) United States Patent
Austin

(10) Patent No.: US 7,213,857 B2
(45) Date of Patent: May 8, 2007

(54) TAILGATE COUNTERBALANCING HINGE WITH BEND IN TORQUE ROD

(75) Inventor: Donald Mossom Austin, Perkinsfield (CA)

(73) Assignee: M&C Corporation, Sterling Heights, MI (US)

( * ) Notice: Subject to any disclaimer, the term of this patent is extended or adjusted under 35 U.S.C. 154(b) by 0 days.

(21) Appl. No.: 11/247,274

(22) Filed: Oct. 12, 2005

(65) Prior Publication Data
US 2006/0082181 A1    Apr. 20, 2006

Related U.S. Application Data

(60) Provisional application No. 60/619,494, filed on Oct. 15, 2004.

(51) Int. Cl.
*B60P 1/267* (2006.01)

(52) U.S. Cl. .......................... 296/50; 296/53; 296/57.1
(58) Field of Classification Search .................. 296/50, 296/53, 57.1, 146.8
See application file for complete search history.

(56) References Cited

U.S. PATENT DOCUMENTS

| | | | | |
|---|---|---|---|---|
| 2,984,517 | A | * | 5/1961 | Farrow et al. ................. 297/57 |
| 3,336,070 | A | * | 8/1967 | Jackson ....................... 296/57.1 |
| 5,358,301 | A | * | 10/1994 | Konchan et al. .......... 296/146.1 |
| 2004/0178651 | A1 | * | 9/2004 | Austin ......................... 296/57.1 |
| 2004/0262938 | A1 | * | 12/2004 | Bruford et al. ................ 296/50 |
| 2004/0262939 | A1 | * | 12/2004 | Miller et al. ................... 296/50 |
| 2004/0262944 | A1 | * | 12/2004 | Koehler et al. ......... 296/146.11 |

* cited by examiner

*Primary Examiner*—Lori L. Lyjak
(74) *Attorney, Agent, or Firm*—Nixon & Vanderhye P.C.

(57) ABSTRACT

A tailgate lift assist counterbalancing hinge assembly that can be retrofitted to the exterior of a vehicle's tailgate is disclosed. The hinge assembly includes first and second tailgate brackets for attaching the hinge assembly to the exterior of tailgate. The first tailgate bracket includes a perpendicularly bent flange to facilitate attachment of the bracket to the tailgate. The hinge assembly also includes a torque rod with a bend to facilitate access to a fastener used to attach the first tailgate bracket through the bent flange to the exterior of the tailgate. A retainer block, which is positioned on a flange of the second tailgate bracket, is secured with the bracket to the exterior of tailgate using a second fastener. The torque rod extends on the exterior of the tailgate between the first and second tailgate brackets.

23 Claims, 12 Drawing Sheets

TAILGATE COUNTERBALANCING HINGE WITH BEND IN TORQUE ROD

RELATED APPLICATIONS

This application claims the benefit of Provisional Application Ser. No. 60/619,494, filed Oct. 15, 2004, the entire contents of which are hereby incorporated by reference in this application.

BACKGROUND OF THE INVENTION

The present invention relates to vehicle body closure panels, and more particularly to a tailgate lift assist counterbalancing hinge assembly that can be retrofitted to a vehicle's tailgate.

Vehicle body closure members, such as a tailgate, are pivotally mounted between body side panels forming the pillars at the rear of the vehicle. The tailgate pivots about a hinge axis between a horizontal, open position, and a vertical, closed position. Preferably, the mounting assemblies for the tailgate permit the tailgate to be removed, and this has been accomplished in a known construction when the tailgate is pivoted to a position between the fully open or fully closed positions. For example, the tailgate may include hinge pins that extend outwardly along the hinge axis that removably connect into brackets carried on the truck body. When the tailgate is pivoted to a predetermined intermediate position, for example, 15° away from a fully closed position, at least one of the hinge pins slips through a slot in the connecting bracket as the tailgate is lifted at one end from the truck body.

Some of the tailgate mounting assemblies include a spring bias assist for assisting movement and counterbalancing the weight of a tailgate during opening or closing movements. One previously known mechanism, in which a torque rod provides spring biasing between the tailgate and the body panel pillars, carries the torque rod on assemblies that form the pivots for the tailgate. Since the torque rod forms a portion of the pivot assembly, the torque rod must be installed for the tailgate to pivot and thus complicates the assembly procedure. Moreover, the torque rod may require particularly configured ends that complicate production of the parts before assembly.

A previously known tailgate may use hinge pin trunions for pivoting, and the torque rod is preformed and installed into the tailgate in a complex and intricate procedure. For example, during assembly of the tailgate, the stationary end of the rod has to be aligned with an aperture that exposes the end for attachment outside of the tailgate while the anchoring end is aligned with a reinforcement plate located inside the tailgate. All of the aligning must be performed while the torque rod is carried within the interior of the tailgate and the procedure may be difficult and time consuming. Moreover, numerous components are required to assemble the torque rod to the tailgate. Other types of springs used in place of the torque rod are difficult to install within the confines of tailgates made of inner and outer panels joined together before the hinge assembly is mounted. Moreover, such assemblies may be difficult to repair and replacement parts are complex and expensive.

Some vehicles are manufactured with tailgate mounting assemblies that do not include a mechanism for assisting movement by counterbalancing the weight of the tailgate during opening or closing movements. A vehicle may be ordered without a lift assist mechanism because the person buying the vehicle may not be able to afford, or maybe unwilling to pay, the additional cost of adding the lift assembly mechanism at the time the vehicle was purchased, or because the buyer simply did not appreciate the effort required to raise and lower a tailgate that can be heavy, and thus hard to lift or move when being closed or opened. In time, the vehicle operator may come to regret his or her decision to buy the vehicle without the lift assist mechanism. The present invention solves this problem by providing a simplified tailgate lift assist counterbalancing hinge assembly that can be retrofitted to the exterior of an existing vehicle tailgate.

BRIEF DESCRIPTION OF THE INVENTION

The present invention is directed to a tailgate lift assist counterbalancing hinge assembly that can be retrofitted to the tailgate of a vehicle.

The counterbalancing hinge assembly of the present invention pivotally supports the tailgate between the left and right sidewalls enclosing a rear compartment or bed of a vehicle. The counterbalancing hinge assembly includes first and second assemblies that pivotally support the tailgate and that secure a linear torque rod with respect to the tailgate and the vehicle's body. The torque rod extends between the first and second assemblies exterior to the tailgate. Where the first assembly is used to secure the torque rod to the vehicle body, the first assembly includes a first body bracket that is secured to a sidewall of the vehicle. The first body bracket includes an elongated key slot that receives an elongated key of a pivot coupling having a faceted opening for receiving a correspondingly faceted end of the torque rod.

The first assembly also includes a first tailgate bracket that attaches to the exterior of a tailgate. A first hinge cup is secured to the first tailgate bracket by a stem that is inserted into an opening in the bracket. The first hinge cup is generally cylindrical and includes a cavity in which the pivot coupling is received to support the first hinge cup, and thus, the tailgate.

The first tailgate bracket has flanges that are especially adapted for attachment to the exterior of the tailgate. One flange is bent substantially perpendicular to a bottom portion of the first tailgate bracket to facilitate the attachment of the bracket to the bottom edge of the tailgate using a fastener inserted through the flange. The torque rod includes a bend, such that an operator installing the first tailgate bracket onto the exterior of the tailgate has relatively unobstructed access to the fastener used to secure the first tailgate bracket to the tailgate.

The second assembly of the counterbalancing hinge assembly is secured to, and pivotally supports the tailgate at, the sidewall of the vehicle body that is opposite to the sidewall to which the first assembly is secured. The second assembly includes a second body bracket that is secured to the opposite sidewall. The second body bracket has a mounting portion that receives an elongated key attached to the mounting portion. A pivot coupling includes a radially extending elongated slot for receiving the elongated key.

The second assembly also includes a second tailgate bracket that also attaches to the exterior of the tailgate. A second hinge cup is secured to the second bracket by a stem that is inserted into a corresponding hole in the second tailgate bracket. The second hinge cup is generally cylindrical and includes a cavity in which the pivot coupling is received to support the second hinge cup, and thus, the tailgate.

A retainer assembly secures a second end of the torque rod to the tailgate. The retainer assembly is comprised of a retainer block having an opening for insertion of the torque rod. The opening, which is preferably faceted, corresponds in shape to the second end of the torque rod, which is also faceted. The retainer block is secured to the second tailgate bracket, and thus, to the exterior of the tailgate, with a fastener that serves the dual purposes of closing a slot in the retainer block to secure the retainer block around the faceted second end of the torque rod, and securing the retainer block to a second tailgate bracket, and thus, the tailgate.

The second tailgate bracket accommodates and supports the retainer assembly in connection with the retainer assembly's attachment to the exterior of the tailgate. A flange is recessed from a bottom portion of the second tailgate bracket to accommodate the path of the torque rod and to ensure that the pivot access of the torque rod is generally aligned with an axis of rotation of the pivot coupling supporting the second hinge cup, and thus, the tailgate. The recessed flange of the second tailgate bracket also simplifies the installation of the retainer assembly to the exterior of the tailgate, such that an operator installing the second tailgate bracket and retainer assembly onto the exterior of a tailgate has relatively unobstructed access to the retainer assembly.

Thus, the counterbalancing hinge assembly provides a mechanism for assisting in the pivotal movement of the tailgate. As the tailgate is rotated between an upright, closed position and a horizontal, open position the torque rod is forced to correspondingly twist because its first end is rigidly secured to a sidewall of the vehicle via the first assembly, while its a second end is secured to the tailgate via the retainer assembly of the second assembly. The torsional force in the torque rod provides a forces that tends to move the tailgate away from the fully closed position and the fully opened position.

The counterbalancing hinge assembly also provides a mechanism for easy removal of the tailgate. When the torque rod is in an intermediate, removal position, the torque rod does not experience a torsional force due to twisting. Because the torque rod is torsionally unbiased when it is in the intermediate position, the pivot coupling including the radially extending elongated slot can be removed from the elongated key as the tailgate is lifted up.

BRIEF DESCRIPTION OF THE DRAWINGS

The various features and advantages of this invention will become apparent to those skilled in the art from the following detailed description. The drawings that accompany the detailed description can be briefly described as follows.

DETAILED DESCRIPTION OF THE INVENTION

Figure 1:
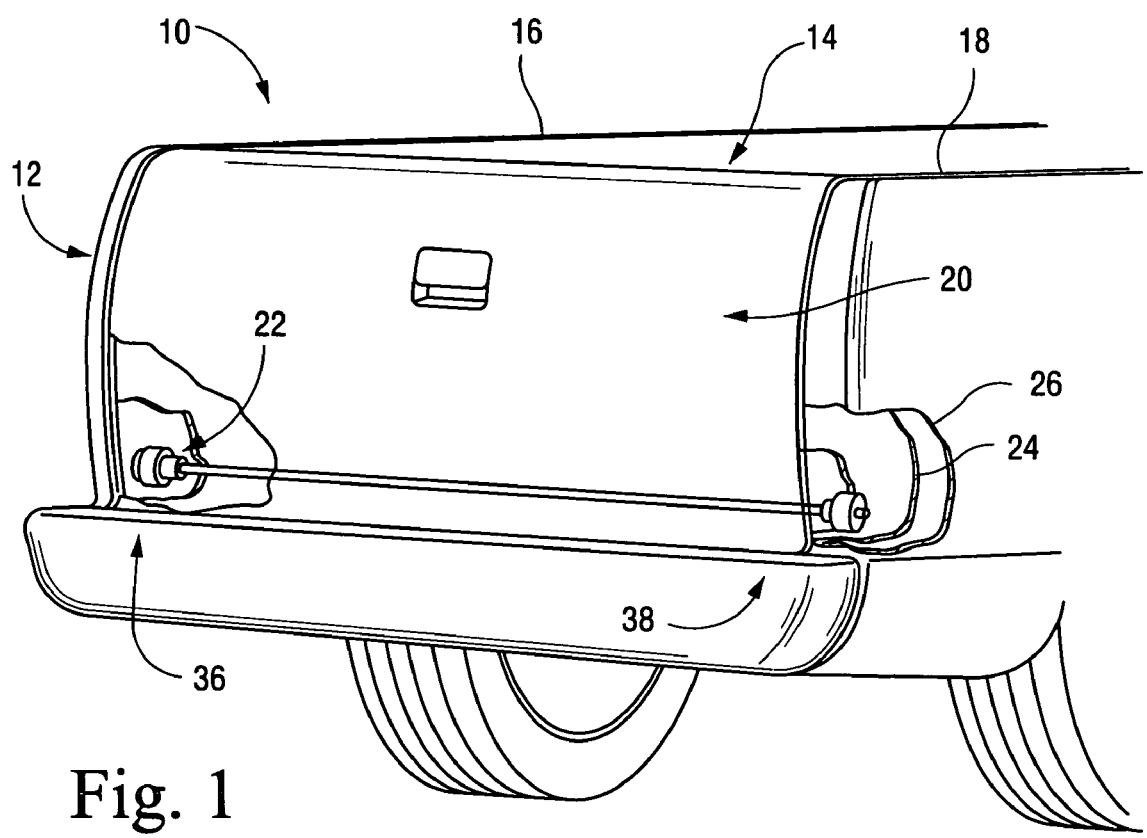
FIG. 1 shows a schematic, perspective view of a vehicle and tailgate.

FIG. 1 illustrates a motor vehicle 10 including a vehicle body 12 with a rear compartment or bed 14 enclosed by a left sidewall 16, right sidewall 18, and a tailgate 20. A counterbalancing hinge assembly 22 pivotally supports the tailgate 20 between the left sidewall 16 and the right sidewall 18.

The tailgate 20 is pivotally supported between pillars formed by the sidewalls 16 and 18. Typically, as shown in the cutaway in FIG. 1, body panels such as the left sidewall 16 and right sidewall 18 and the tailgate 20 are formed by inner and outer panels 24 and 26, respectively, of sheet metal joined at the ends by overlapping flanges or the like that reinforce the planar expanses of the sheet metal forming the side panel. Of course, other materials may be used in constructing the vehicle body 12 and the counterbalancing hinge assembly 22 without departing from the present invention. The invention is not dependent upon the vehicle construction to which it may be applied, and thus it may be installed on various different brands of vehicles even after initial assembly of the vehicle. The "retrofit" of the counterbalancing hinge assembly 22 on a vehicle 10 involves installing the hinge assembly 22 on the exterior of a tailgate 20, as illustrated in FIGS. 2 and 3.

Figure 2:
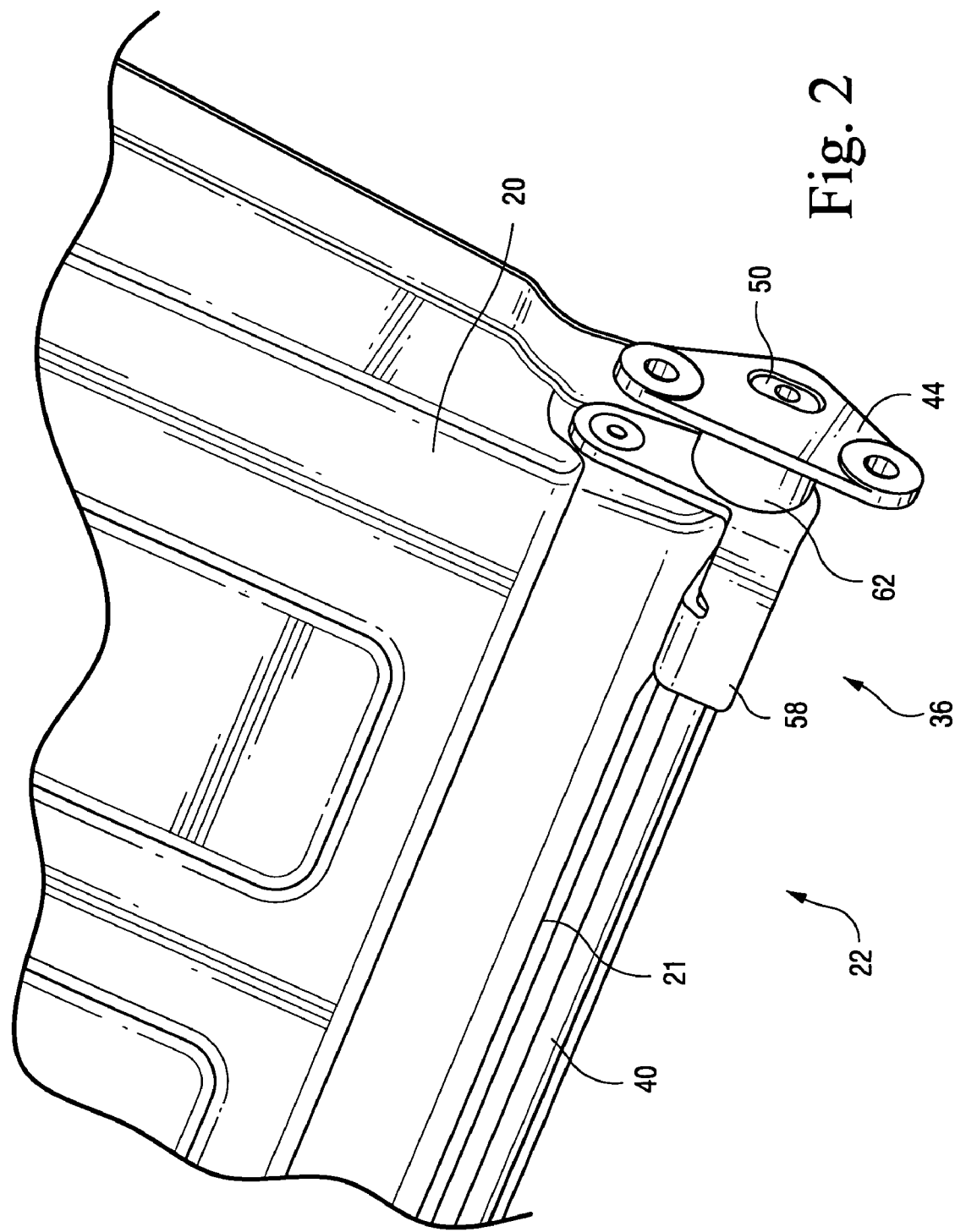
FIG. 2 shows a perspective view from the side of a tailgate that faces the bed of a vehicle of a first assembly of one embodiment of a counterbalancing hinge assembly installed on the exterior of the tailgate.
Figure 3:
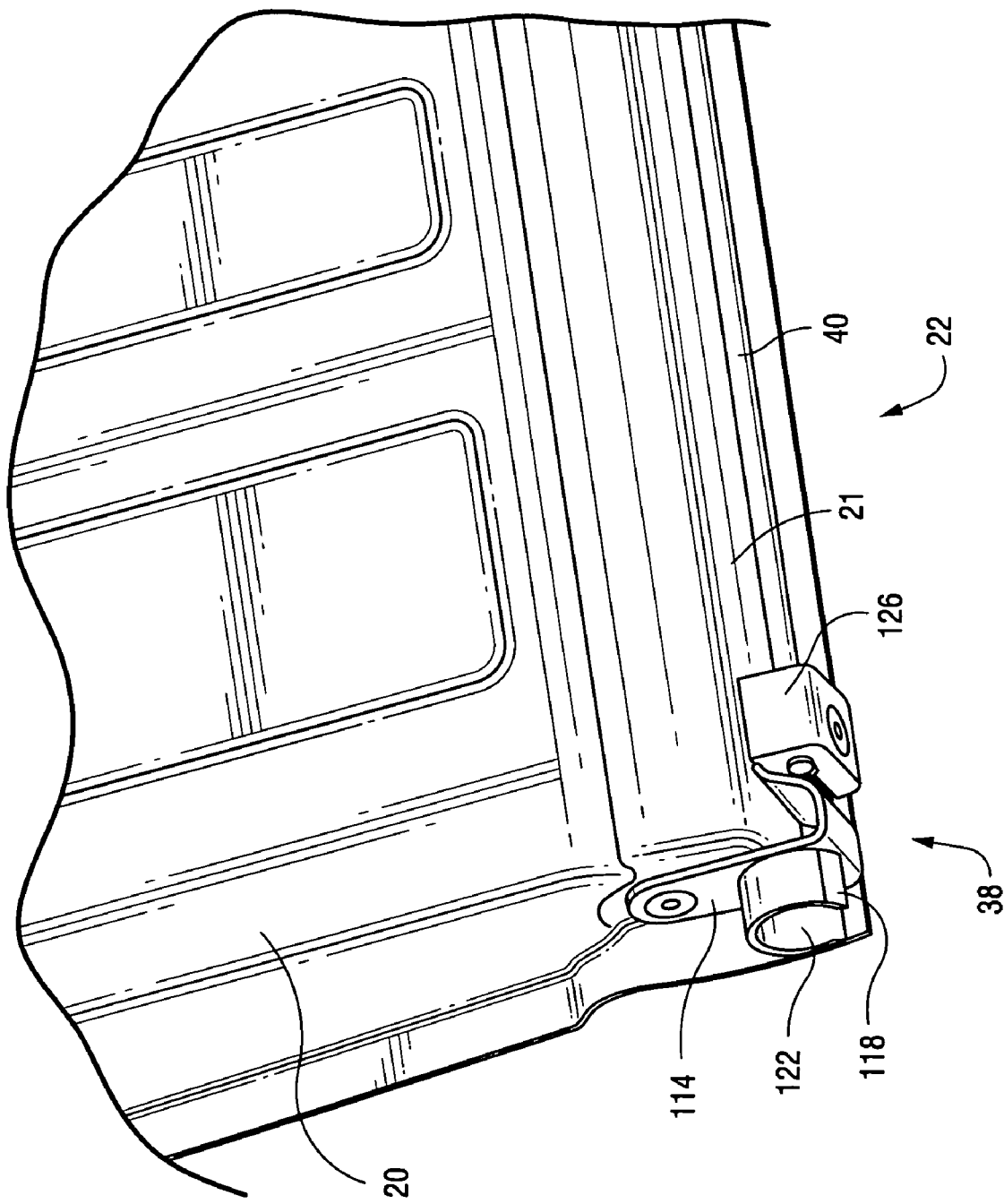
FIG. 3 shows a perspective view from the side of a tailgate that faces the bed of a vehicle of a second assembly of one embodiment of a counterbalancing hinge assembly installed on the exterior of the tailgate.
Figure 4:
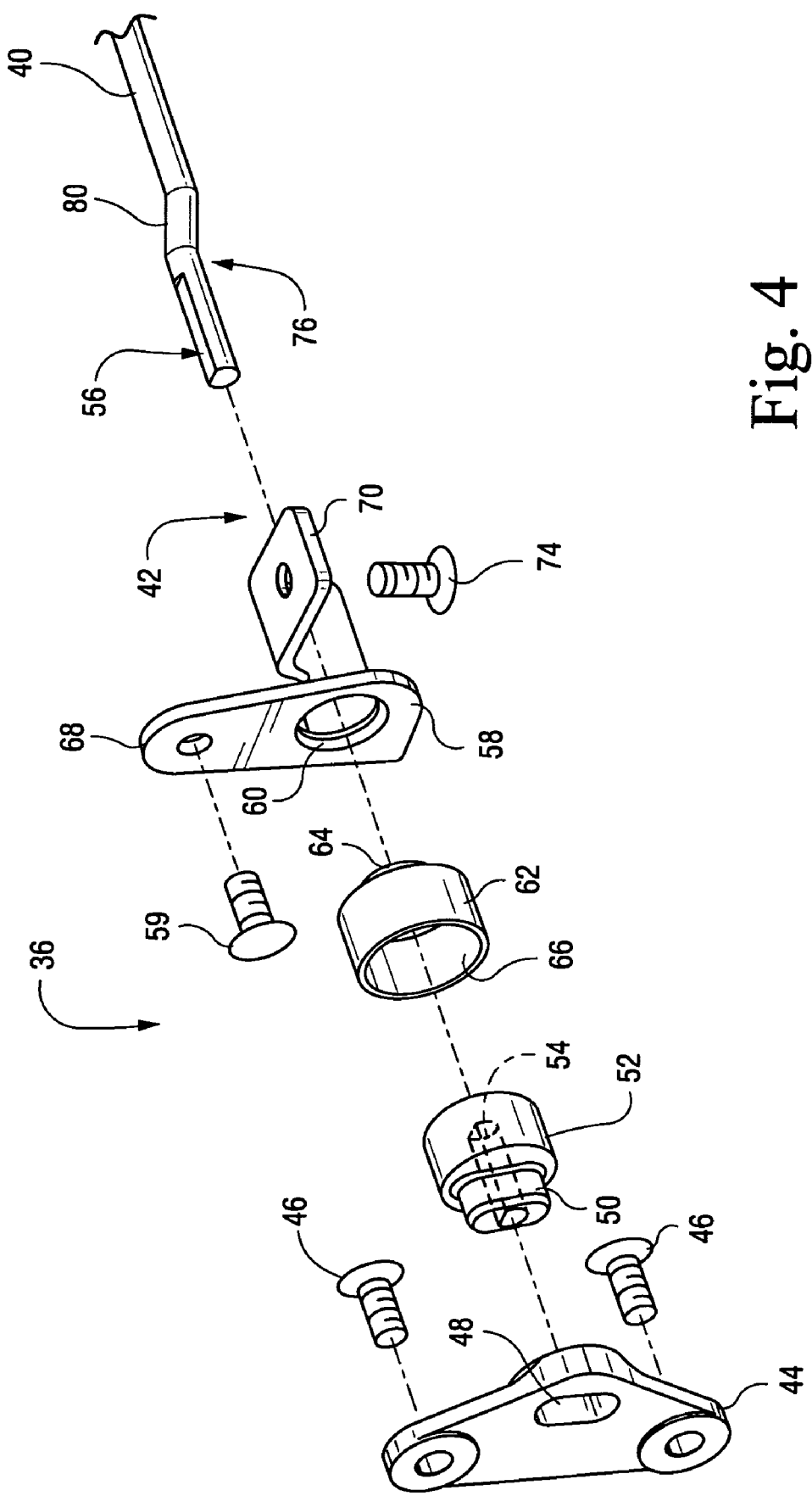
FIG. 4 shows an exploded, perspective view of the first assembly of FIG. 2.
Figure 6:
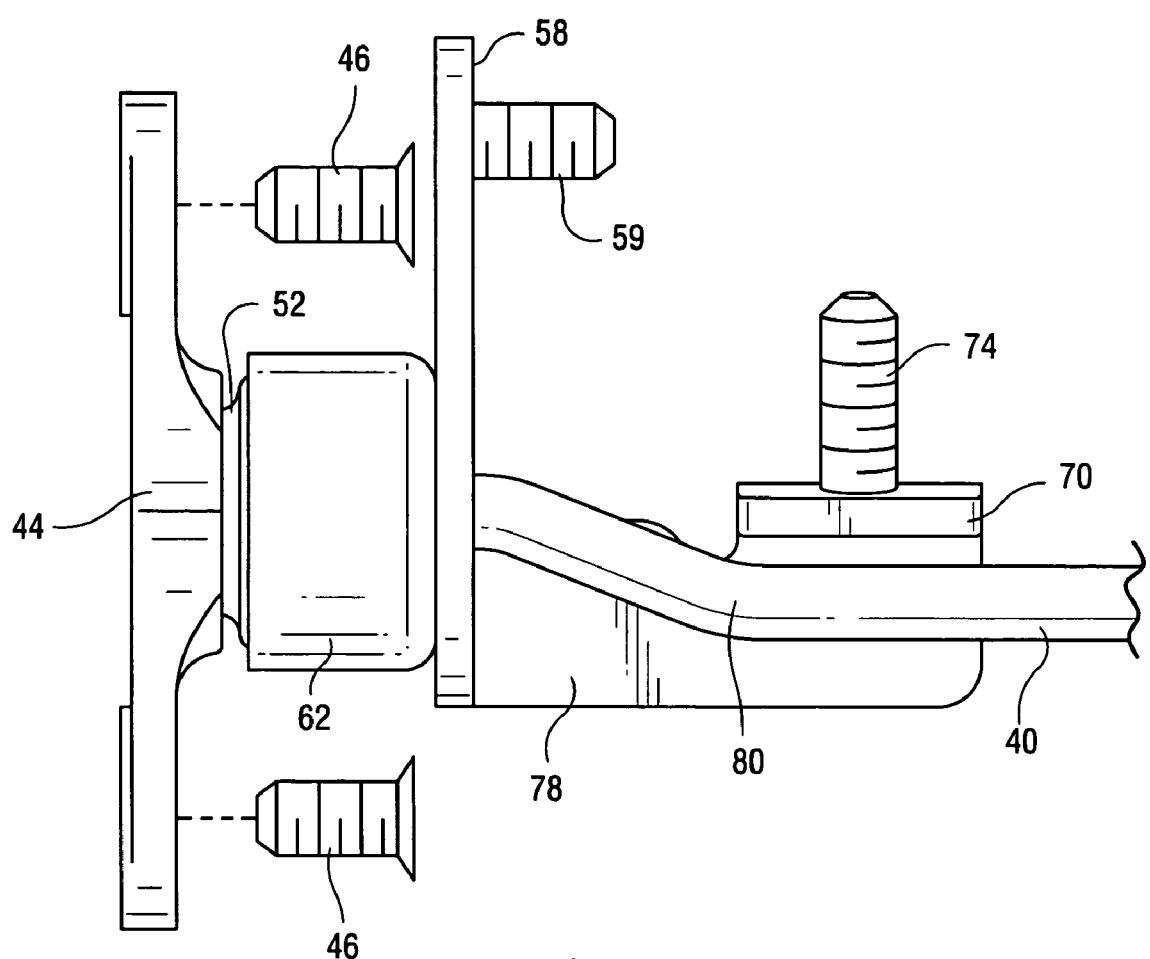
FIG. 6 shows an assembled, side elevational view of the first assembly of FIG. 2.
Figure 7:
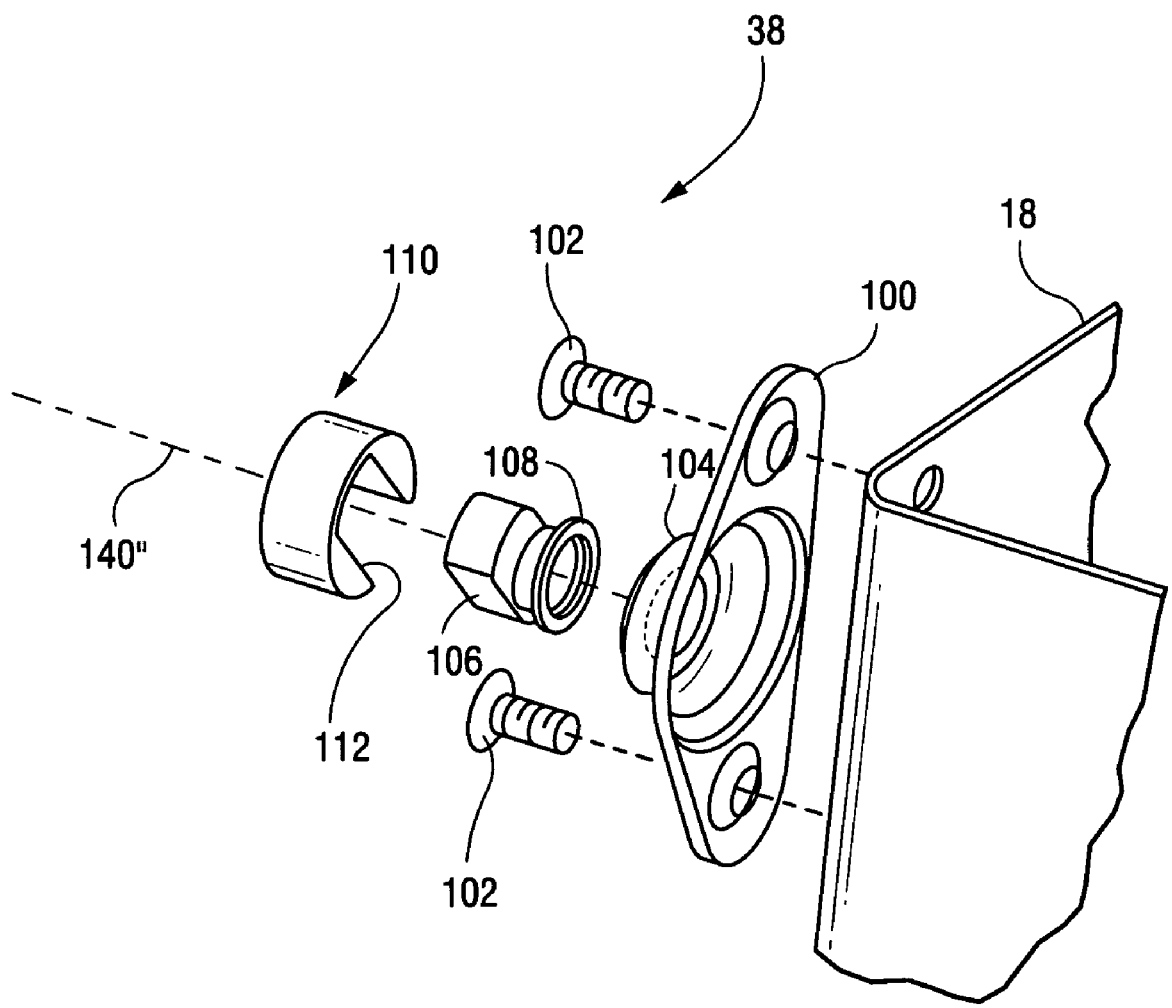
FIG. 7 shows an exploded, perspective view of a portion of the second assembly of FIG. 3.

FIG. 4 illustrates an exploded, perspective view of a first assembly 36 of the counterbalancing hinge assembly 22 shown in FIG. 2. FIGS. 6 and 7 each illustrate a partial exploded view of a second assembly 38 of the counterbalancing hinge assembly 22 shown in FIG. 3. The counterbalancing hinge assembly 22 is comprised of an axially elongated torque rod 40 extending between first and second assemblies 36 and 38. Torque rod 40 is generally aligned along a pivot axis 42 extending between the left sidewall 16 and right sidewall 18. The first assembly 36 and second assembly 38 secure the torque rod 40 with respect to the vehicle body 12 and the tailgate 20. Various means can be used to mount the first assembly 36 and second assembly 38 at opposing portions of the vehicle body 12 without departing from the scope of the present invention.

The first assembly 36 secures the torque rod 40 to tailgate 20 at the vehicle body 12 and pivotally supports the tailgate 20 at the left sidewall 16. It is to be understood that although reference is made to first assembly 36 securing torque rod 40 to the left sidewall 16, the first assembly 36 may alternatively secure torque rod 40 to the right sidewall 18 in other embodiments of the present invention.

The first assembly 36 includes a first body bracket 44 that is secured to the left sidewall 16 with fasteners 46, although other methods of attachment may be used, such as, but not limited to, welding. The first body bracket 44 includes an elongated key slot 48 that receives an elongated key 50 of a pivot coupling 52. The pivot coupling 52 includes a faceted opening 54 for receiving a correspondingly faceted end 56 of the torque rod 40.

A first tailgate bracket 58 attaches to the exterior of tailgate 20 with fasteners 59 and 74; however, additional fasteners, welding, or other methods of attachment may be used to secure the first tailgate bracket 58 to the tailgate 20. The first tailgate bracket 58 includes an opening 60, through which the faceted end 56 of torque rod 40 passes to be inserted in faceted opening 54 of pivot coupling 52. A first hinge cup 62 is positioned generally coaxially with the opening 60. Preferably, first hinge cup 62 includes a stem 64 for securing cup 62 to the first tailgate bracket 58 by stem 64 being inserted into opening 60 in bracket 58. Preferably, first hinge cup 62 is welded to first tailgate bracket 58, however, other methods of securing cup 62 to bracket 58 may be used. The first hinge cup 62 is generally cylindrical and includes a cavity 66 in which the pivot coupling 52 is received.

Figure 5:
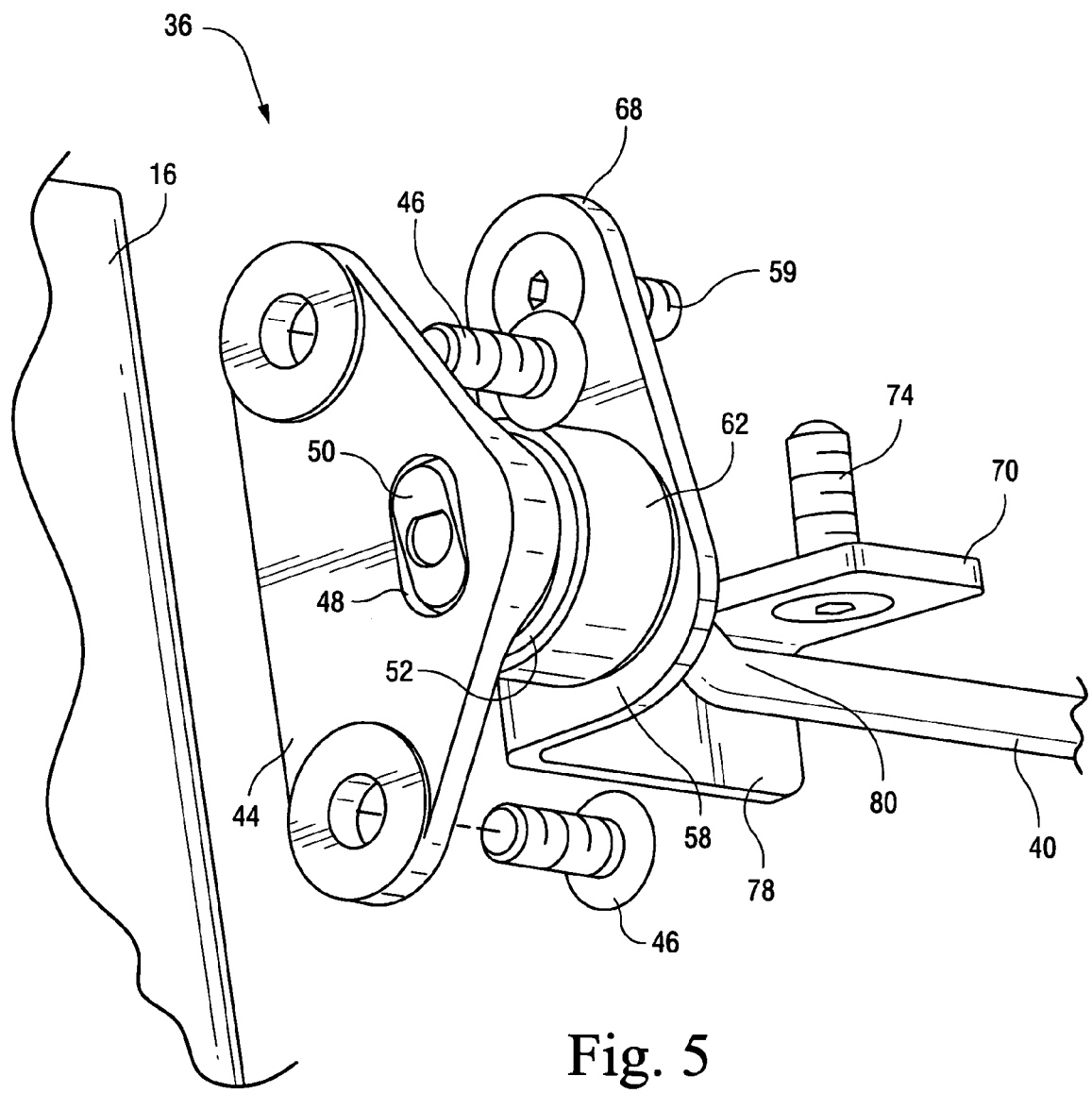
FIG. 5 shows an assembled, perspective view of the first assembly of FIG. 2.

Referring to FIGS. 5 and 6, the flanges 68 and 70 are secured to the exterior of tailgate 20 by fasteners 59 and 74. Flange 70 and an end portion 76 (FIG. 4) of the torque rod 40 are specially adapted for attachment to the exterior of the tailgate 20. The flange 70 is bent substantially perpendicular to a bottom portion 78 of bracket 58 to facilitate the attachment of bracket 58 to a bottom edge 21 of tailgate 20 by fastener 74 being inserted through flange 70. The torque rod 40 includes a bend 80, such that an operator installing the first tailgate bracket 58 onto the exterior edge 21 of the tailgate 20 has relatively unobstructed access to the fastener 74. Preferably, bend 80 is a "dogleg" bend, in which the bent portion of torque rod 40 extends at substantially a thirty (30°) degree angle with respect to the longitudinal axis of the majority of torque rod 40.

FIG. 7 illustrates an exploded, perspective view of a portion of the second assembly 38 of the counterbalancing hinge assembly 22. The second assembly 38 is secured to, and pivotally supports the tailgate 20 at the right sidewall 18 of vehicle body 12. It is to be understood that although reference is made to supporting tailgate 20 at the right sidewall 18, the second assembly 38 may alternatively be secured to, and pivotally support tailgate 20 at the left sidewall 16 in other embodiments. The second assembly 38 includes a second body bracket 100 that is secured to the right sidewall 18 with fasteners 102, although other methods of attachment may be used, such as, but not limited to, welding. The second body bracket 100 includes mounting portion 104 that receives an elongated key 106. The elongated key 106 includes a stem 108 for welding or otherwise securing the elongated key 106 to the mounting portion 104. A pivot coupling 110 includes an elongated slot 112 for receiving the elongated key 106.

Figure 8:
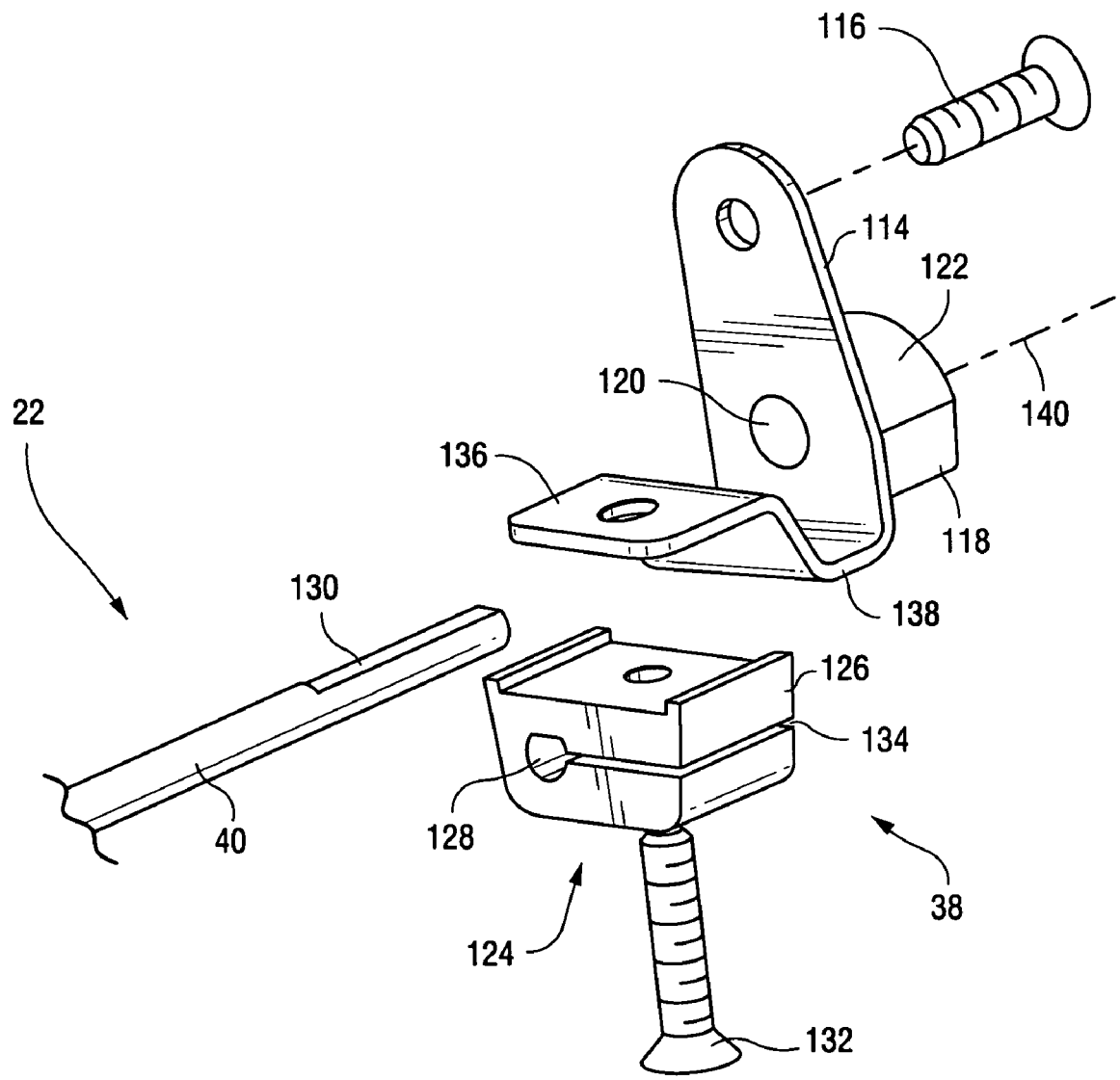
FIG. 8 shows another exploded, perspective view of a further portion of the second assembly of FIG. 3.
Figure 9:
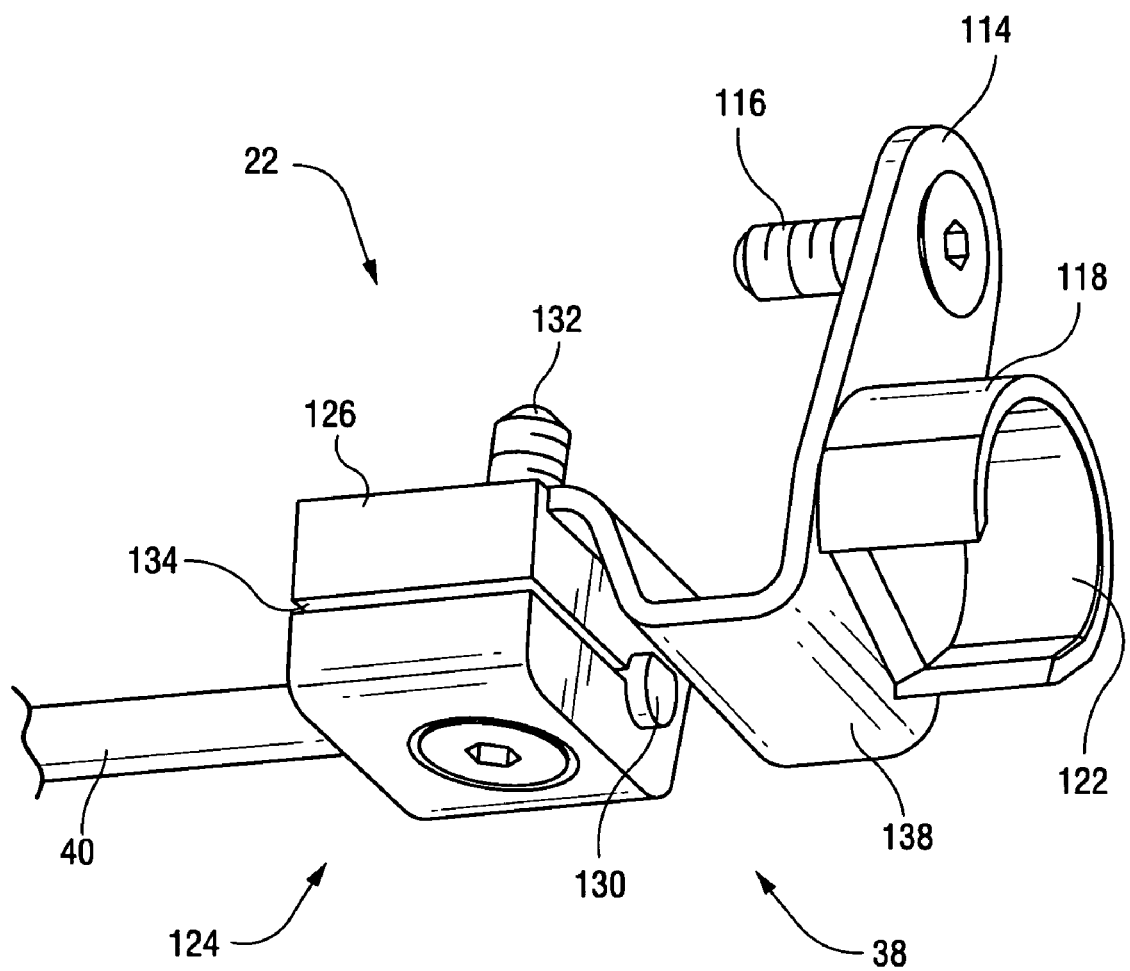
FIG. 9 shows an assembled, perspective view of the second assembly of FIG. 3.
Figure 10:
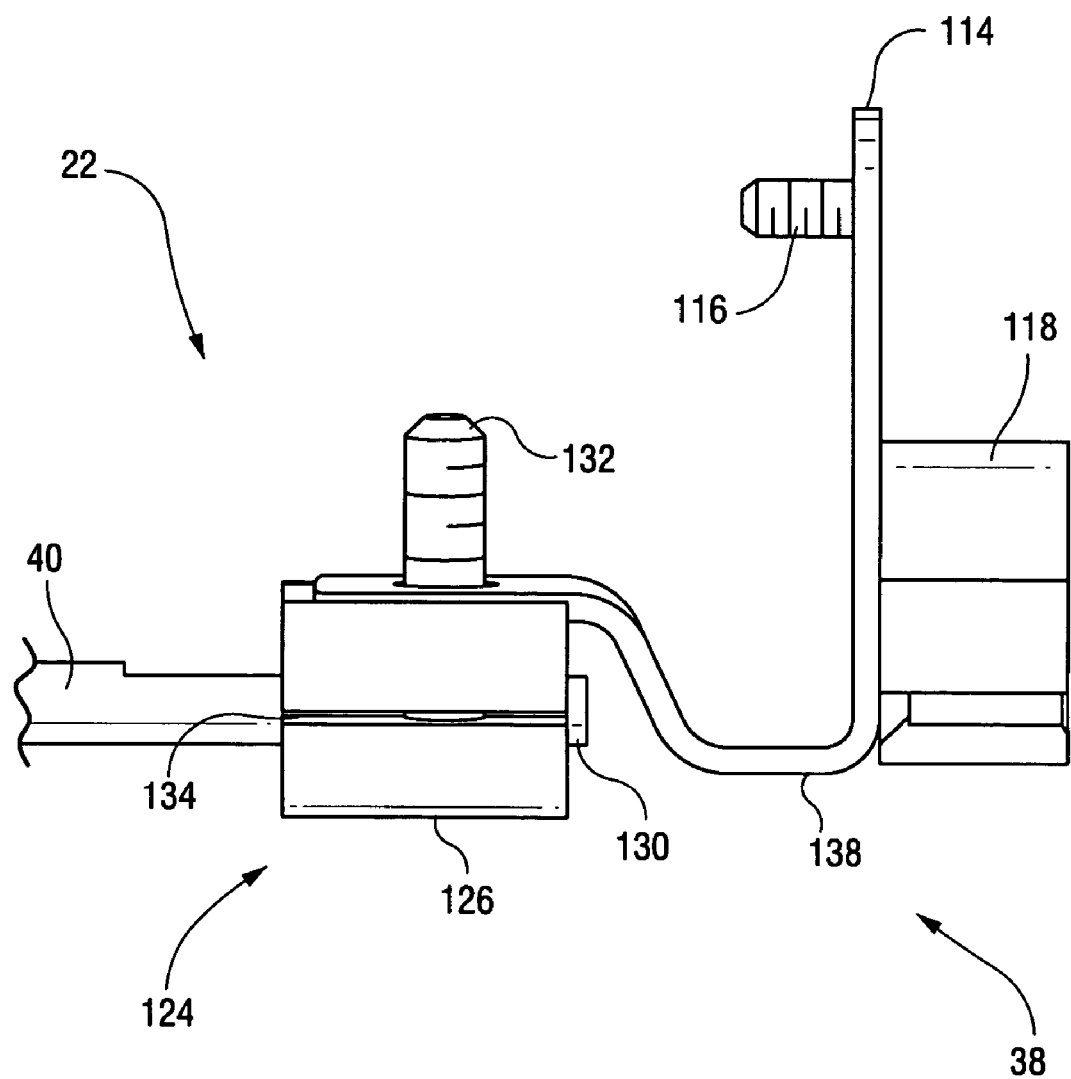
FIG. 10 shows an assembled, side elevational view of the second assembly of FIG. 3.

FIGS. 8–10 illustrate several views of another portion of the second assembly 38 of the counterbalancing hinge assembly 22. A second tailgate bracket 114 attaches to the exterior of a second side of tailgate 20 with fasteners 116 and 132; however, additional fasteners, welding, or other methods of attachment may be used to secure the second tailgate bracket 114 to the tailgate 20. The second tailgate bracket 114 includes a second hinge cup 118. The second hinge cup 118 is secured to the second tailgate bracket 114 at a stem 120. Preferably, the second hinge cup 118 is welded to the second tailgate bracket 114, however, other methods of securing may be used. The second hinge cup 118 is generally cylindrical and includes a cavity 122 (FIG. 9) in which the pivot coupling 110 is received.

A retainer assembly 124 receives a second end of torque rod 40. The retainer assembly 124 is comprised of a retainer block 126 with a faceted opening 128 corresponding in shape to a faceted end 130 of torque rod 40. Retainer block 126 is secured to the exterior of tailgate 20 and second tailgate bracket 114 by a fastener 132. Preferably, the fastener 132 serves the dual purposes of closing a slot 134 in retainer block 126 and securing retainer block 126 to tailgate 20. The closing of the slot 134 secures the retainer block 126 around the faceted end 130 in the faceted opening 128 of block 126 and, thus, and generally prevents the torque rod 40 from sliding out of the retainer block 126.

The second tailgate bracket 114 accommodates and supports the retainer assembly 124 using a flange 136 that attaches to the exterior of tailgate 20. Flange 136, which supports retainer block 126, is bent up with respect to a bottom portion 138 of the second tailgate bracket 114 to accommodate the path of the torque rod 40 and ensure that the pivot axis 42 of the torque rod 40 is generally aligned with an axis of rotation 140 of the pivot coupling 110. The recessed portion 136 of flange 138 also simplifies the installation of the retainer assembly 124 to the exterior of the tailgate 20, such that an operator installing the second tailgate bracket 114 and retainer assembly 124 onto the exterior of the tailgate 20 has relatively unobstructed access to the retainer assembly 124.

Although retainer block 126 is shown in FIGS. 8 to 10 as being supported by flange 136, it should be understood that retainer block 126 could alternatively be attached directly to the bottom edge 21 of tailgate 20. In this instance, depending on whether or not a separate support plate is used to attach block 126 to tailgate 20, the height of retainer block 126 may have to be modified to accommodate the path of torque rod 40 and ensure that the pivot axis 42 of torque rod 40 is generally aligned with the axis of rotation 140 of the pivot coupling 110. The mounting of retainer block 126 directly on the bottom edge 21 of tailgate 20 has the benefit of providing greater flexibility in the design and construction of torque rod 40. In such an arrangement, it may be possible to change the length of torque rod 40 to achieve different torsional forces within torque rod 40, as it is twisted in response to the rotation of tailgate 40. The torsional force in torque rod 40 may also be further increased or decreased by corresponding or independent changes in the diameter of torque rod 40.

In an alternative embodiment of the present invention, pivot body 110 shown in FIG. 7 could also include a stem with a faceted opening for receiving and securing the second, faceted end of torque rod 40 in the pivot body 110, and thus, to the sidewall 18 of vehicle 10. In this instance, second hinge cup 118 can be mounted in an opening in second mounting bracket 114 through which the second end of torque rod 40 passes for insertion into the stem of pivot body 110. An example of this embodiment is shown as second assembly 34 in FIG. 4 of commonly assigned U.S. Pat. No. 6,796,592, the entire contents of which are incorporated herein by reference. In this instance, retainer block 126 would then be mounted on first tailgate bracket 58 or directly on the bottom edge 21 of tailgate 20 on the same side of tailgate 20 as bracket 58.

The torque rod 40 is rigidly retained at faceted end 130 by the retainer assembly 124 so as to move with the tailgate 20. Thus, as the tailgate 20 is rotated between the upright, closed position and the horizontal, open position, the torque rod 40 is forced to correspondingly twist because of the first faceted end 56 being rigidly secured to the left sidewall 16 via the first assembly 36 and the second faceted end 130 being secured to the tailgate 20 via second end assembly 38.

Preferably, the unbiased portion of the torque rod 40 occurs when the tailgate 20 is in an intermediate position between a fully closed position and a fully open position, whereby torsional force is introduced tending to pivot the tailgate 20 away from the closed position when it is unlatched, and to raise it to the closed position when it has been lifted from its open position. The latching of the tailgate 20 in the closed position could be done in a well known manner without departing from the present invention.

Figure 11:
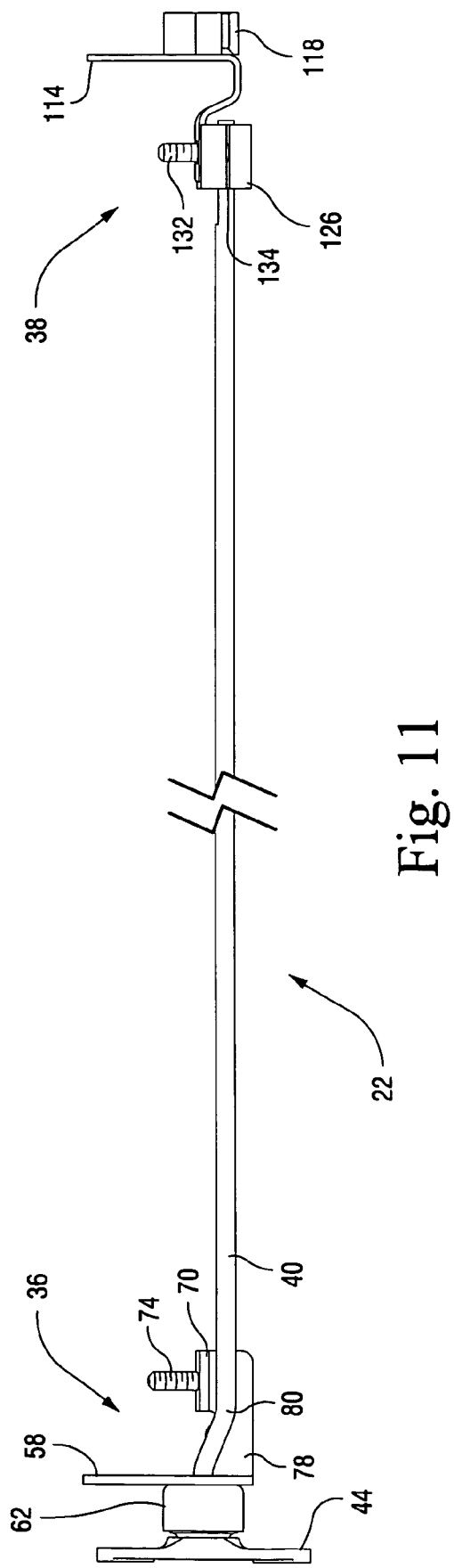
FIG. 11 shows a schematic assembled view of the counterbalancing hinge assembly of FIGS. 2–3.
Figure 12:
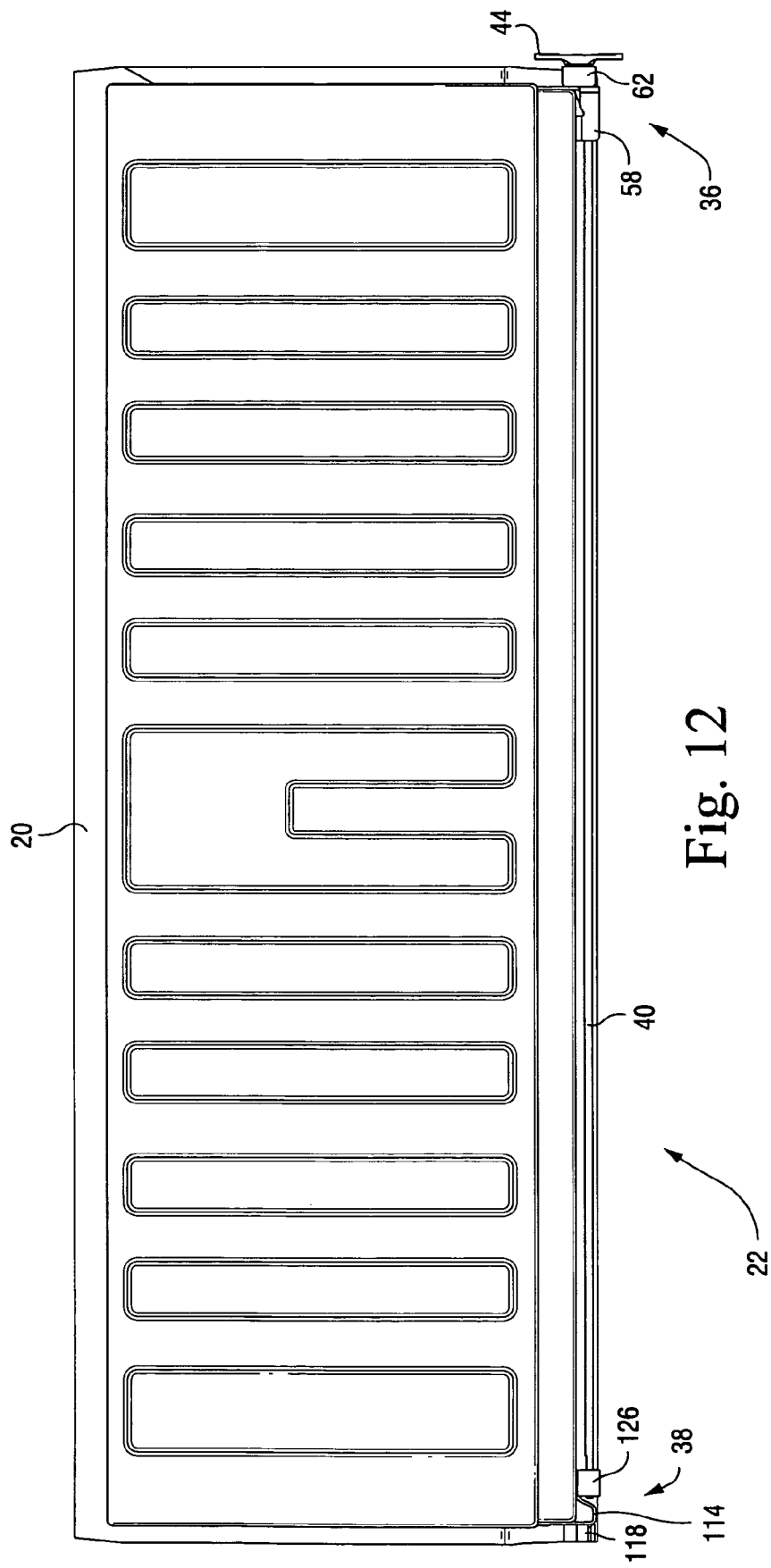
FIG. 12 is a side elevational view from the side of a tailgate that faces the bed of a vehicle hinge assembly of FIGS. 2 and 3 mounted on the tailgate.

The parts of counterbalancing hinge assembly 22 are illustrated in an assembled configuration in FIG. 11, and in an assembled configuration as mounted on the exterior of tailgate 20 in FIG. 12. The perspective of FIG. 12 is from the side of tailgate 20 that faces the bed of a vehicle. Counterbalancing hinge assembly 22 is assembled by first attaching body brackets 44 and 100 to vehicle sidewalls 16 and 18. Thereafter, hinge cups 62 and 118 are attached to the first and second tailgate brackets 58 and 114, respectively. First and second tailgate brackets 58 and 114 are then attached to the exterior of tailgate 20, as shown in FIG. 12. The torque rod 40 is then attached to pivot coupling 52, after which torque rod 40 is inserted through hinge cup 62 and extended to the other side of tailgate 20 for insertion into hole 128 of retainer block 126. As torque rod 40 is extended to the other side of tailgate 20, pivot coupling 52 is caused to be inserted into cavity 66 in hinge cup 62. Retainer block 126 is then attached to tailgate 20 using fastener 132 which passes through retainer block 126 and flange 136 of second tailgate bracket 114, and which is then tightened to maintain retainer block 126 in position.

The tailgate is then positioned for installation on the vehicle 10. The elongated key slot 48, which is, for example, angled 10° open, receives the elongated key 50 of the pivot coupling 52, as best seen in FIG. 5. Then the tailgate 20 is pivoted to an intermediate angle, for example 45° towards open relative to the vertical position, to align the elongated slot 112 of the pivot coupling 110 in the second hinge cup 118 with the elongated key 106. The tilted tailgate 20 is then lowered to engage the elongated key 106 into the elongated slot 112.

The assembly discussed above provides a mechanism for assisting in the pivotal movement of a tailgate and for removably mounting the tailgate between spaced apart body side panels of a vehicle body. Accordingly, the torque rod is twisted so as to induce torsional force within the torque rod as the tailgate is pivoted to either the closed or open positions from the removal position. This torsional force provides a counterbalancing force to assist with pivotal movement of the tailgate. The assembly permits facile assembly of the counterbalancing hinge assembly 22 and convenient removal of the tailgate 20 in the removal position.

While the invention has been described in connection with what is presently considered to be a preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hinge assembly for assisting in the pivotal movement of a tailgate mounted between spaced apart body side panels of a vehicle body, the assembly comprising:
   a first assembly attached exterior to a first end of the tailgate and rotatably supporting the tailgate at a first side panel of the vehicle body,
   a second assembly attached exterior to a second end of the tailgate and rotatably supporting the tailgate at a second side panel of the vehicle body, and
   a torque rod exterior to the tailgate and extending between the first and second assemblies, a first end of the torque rod being secured to the first side panel by the first assembly, and a second end of the torque rod being secured to the tailgate by the second assembly,
   the torque rod being shaped to facilitate attachment of the first assembly to the exterior of the first end of the tailgate,
   the second assembly being comprised of a retainer assembly that is attached to the tailgate, and that includes a slit opening in which the second end of the torque rod is inserted and secured.

2. A hinge assembly for assisting in the pivotal movement of a tailgate mounted between spaced apart body side panels of a vehicle body, the assembly comprising:
   a first assembly attached exterior to a first end of the tailgate and rotatably supporting the tailgate at a first side panel of the vehicle body,
   a second assembly attached exterior to a second end of the tailgate and rotatably supporting the tailgate at a second side panel of the vehicle body, and
   a torque rod exterior to the tailgate and extending between the first and second assemblies, a first end of the torque rod being secured to the first side panel by the first assembly, and a second end of the torque rod being secured to the tailgate by the second assembly,
   the torque rod being shaped to facilitate attachment of the first assembly to the exterior of the first end of the tailgate,
   the second assembly being comprised of a retainer assembly that is attached to the tailgate, and that includes a slit opening in which the second end of the torque rod is inserted and secured,
   wherein the first and second assemblies are comprised of:
      first and second tailgate brackets secured to the first and second exterior ends of the tailgate,
      first and second hinge cups mounted on the first and second tailgate brackets; and
      first and second body brackets mounted on the first and second sidewalls of the vehicle, and supporting the first and second hinge cups;
   the first hinge cup being rotatably positioned over a pivot coupling, the pivot coupling including an opening for receiving the first end of the torque rod and an elongated key for insertion into a slot in the first body bracket to secure the first end of the torque rod to the first side panel as the tailgate is rotated to different positions;
   the second hinge cup being rotatably positioned over a pivot element, the pivot element including an elongated slot for receiving an elongated key mounted on the second body bracket to facilitate removal of the tailgate when the tailgate is rotated to a removal position;
   the torque rod being twisted in tension when the tailgate is pivoted to either a closed or open position from the removal position, thereby providing a counterbalancing force to assist with the pivotal movement of the tailgate, and permitting facile removal of the tailgate from the vehicle body when the tailgate is in the removal position.

3. A hinge assembly for removably mounting a tailgate between spaced apart body side panels of a vehicle body for movement about a pivotal axis between open, closed and removal positions, the assembly comprising:

first and second tailgate brackets secured to opposite exterior ends of the tailgate, first and second hinge cups mounted on the tailgate brackets;

first and second body brackets mounted on opposite sidewalls of the vehicle, and supporting the first and second hinge cups;

at least one of the hinge cups including a pivot element with an elongated slot therein for receiving an elongated key mounted on one of the body brackets;

an axially elongated torque rod having one end in engagement with the elongated key, the torque rod including a bend to accommodate a fastener used to secure one of the tailgate brackets to the exterior of the tailgate; and a retainer assembly secured to the tailgate, the retainer assembly including an opening in which a second end of the torque rod is inserted;

the torque rod being twisted in tension when the tailgate is pivoted to either the closed or open positions from the removal position, thereby providing a counterbalancing force to assist with pivotal movement of the tailgate, and permitting facile removal of the tailgate from the vehicle body when the tailgate is in the removal position.

4. The hinge assembly recited in claim 3, wherein the first tailgate bracket includes first and second flanges for securing the first tailgate bracket to the exterior of the tailgate, and wherein a portion of one of the flanges is bent to facilitate attachment of the first tailgate bracket to the tailgate using the fastener.

5. The hinge assembly recited in claim 4, wherein the fastener is inserted through the bent portion of the first tailgate bracket to attach the first tailgate bracket to the tailgate.

6. The hinge assembly recited in claim 3, wherein the retainer assembly is mounted on the second tailgate bracket, and wherein a second fastener secures the retainer assembly and the second tailgate bracket to the tailgate.

7. The hinge assembly recited in claim 3, wherein the retainer assembly is comprised of a retainer block with a opening in which the second end of the torque rod is inserted.

8. The hinge assembly recited in claim 7, wherein the second end of the torque rod is faceted and the opening is correspondingly faceted for insertion of the second end of the torque rod into the opening.

9. The hinge assembly recited in claim 7, wherein the retainer block includes a slot that is closed around the second end of the torque rod by a fastener securing the retainer block to the tailgate, the closed slot securing the retainer block around the second end of the torque rod to prevent the torque rod from sliding out of the retainer block.

10. The hinge assembly recited in claim 7, wherein the retainer block is mounted directly on a bottom edge of the tailgate.

11. The hinge assembly recited in claim 7, wherein the retainer block is mounted on the second tailgate bracket.

12. The hinge assembly recited in claim 11, where the second tailgate bracket includes a flange that supports the retainer block and that is bent up to accommodate the path of the torque rod and ensure that a pivot axis of the torque rod is generally aligned with an axis of rotation of the second tailgate bracket.

13. A tailgate lift assist counterbalancing hinge assembly that can be retrofitted to a vehicle's tailgate for removably mounting the tailgate between spaced apart body side panels of a vehicle body for movement about a pivotal axis between open, closed and removal positions comprising, the assembly comprising:

first and second tailgate brackets adapted to be secured to first and second exterior ends of the tailgate, the first and second tailgate brackets having first and second hinge cups mounted thereon;

a first elongated key mounted on a first sidewall of the vehicle, and a first elongated slot mounted on a second sidewall of the vehicle;

first and second pivot couplings supported by the elongated key and the elongated slot, the first pivot coupling including a second, partially open, elongated slot therein for receiving the elongated key, the second pivot coupling including a second elongated key for insertion in the first elongated slot;

an axially elongated torque rod having a first end in engagement with the first elongated key, the torque rod including a bend to accommodate a fastener used to secure the first tailgate bracket to the exterior of the tailgate; and a retainer assembly mounted on the second tailgate bracket and secured to the tailgate, the retainer assembly including an opening for insertion of a second end of the torque rod therein;

the torque rod being twisted in tension when the tailgate is pivoted to either the closed or open positions from the removal position, thereby providing a counterbalancing force to assist with pivotal movement of the tailgate, and permitting facile removal of the tailgate from the vehicle body when the tailgate is in the removal position.

14. The hinge assembly recited in claim 13, wherein the first tailgate bracket includes first and second flanges for securing the first tailgate bracket to the exterior of the tailgate, and wherein a portion of one of the flanges is bent to facilitate attachment of the first tailgate bracket to the tailgate using the fastener.

15. The hinge assembly recited in claim 14, wherein the fastener is inserted through the bent portion of the first tailgate bracket to attach the first tailgate bracket to the tailgate.

16. The hinge assembly recited in claim 13, wherein a second fastener secures the retainer assembly and the second tailgate bracket to the tailgate.

17. The hinge assembly recited in claim 13, wherein the retainer assembly is comprised of a retainer block with a opening in which the second end of the torque rod is inserted.

18. The hinge assembly recited in claim 17, wherein the second end of the torque rod is faceted and the opening is correspondingly faceted for insertion of the second end of the torque rod into the opening.

19. The hinge assembly recited in claim 17, wherein the retainer block includes a slot that is closed around the second end of the torque rod by a fastener securing the retainer block to the tailgate, the closed slot securing the retainer block around the second end of the torque rod to prevent the torque rod from sliding out of the retainer block.

20. The hinge assembly recited in claim 17, wherein the retainer block is mounted directly on a bottom edge of the tailgate.

21. The hinge assembly recited in claim 13, wherein the second tailgate bracket includes a flange that supports the retainer block and that is bent up to accommodate the path of the torque rod and ensure that a pivot axis of the torque rod is generally aligned with an axis of rotation of the second tailgate bracket.

22. The hinge assembly recited in claim 13, wherein the bend in the torque rod is a dogleg bend.

23. An assembly for assisting in the pivotal movement of a closure member mounted between spaced apart side panels of a vehicle body, the assembly comprising:

first means attached exterior to a first end of the closure member for rotatably supporting the closure member at a first side panel of the vehicle body, second means attached exterior to a second end of the closure member for rotatably supporting the tailgate at a second side panel of the vehicle body, and means for exerting a torsional force when twisted, the torsional force means being exterior to the closure member and extending between the first and second support means, the torsional force means being secured to the first side panel by the first assembly and to the tailgate by the second assembly, the torsional force means being shaped to facilitate attachment of the first support means to the exterior of the first end of the closure member, the second support means being comprised of means for retaining the torsional force means, the retaining means being attached to the closure member, and including a slit opening in which the torsional force means is inserted and secured.

\* \* \* \* \*